United States Patent
Fangauf et al.

(10) Patent No.: US 9,937,991 B2
(45) Date of Patent: Apr. 10, 2018

(54) SEALING SYSTEM, METHOD AND WATERCRAFT

(71) Applicant: SKF BLOHM + VOSS INDUSTRIES GMBH, Hamburg (DE)

(72) Inventors: Carlos Fangauf, Hamburg (DE); Joerg Brand, Trittau (DE)

(73) Assignee: SKF MARINE GmbH, Hamburg (DE)

( * ) Notice: Subject to any disclaimer, the term of this patent is extended or adjusted under 35 U.S.C. 154(b) by 0 days.

(21) Appl. No.: 15/506,028

(22) PCT Filed: Aug. 5, 2015

(86) PCT No.: PCT/EP2015/068049
§ 371 (c)(1),
(2) Date: Feb. 23, 2017

(87) PCT Pub. No.: WO2016/030159
PCT Pub. Date: Mar. 3, 2016

(65) Prior Publication Data
US 2017/0259898 A1    Sep. 14, 2017

(30) Foreign Application Priority Data
Aug. 28, 2014  (DE) ........................ 10 2014 217 223

(51) Int. Cl.
*B63H 23/32* (2006.01)
*F16J 15/16* (2006.01)
*F16J 15/44* (2006.01)

(52) U.S. Cl.
CPC .......... *B63H 23/321* (2013.01); *F16J 15/162* (2013.01); *F16J 15/441* (2013.01); *B63H 2023/327* (2013.01)

(58) Field of Classification Search
CPC ........ B63H 23/231; F16J 15/32; F16J 15/162; F16J 15/441; F16N 7/36
USPC .............................................. 210/87; 440/83
See application file for complete search history.

(56) References Cited

U.S. PATENT DOCUMENTS

2014/0048461 A1    2/2014    Wrange et al.

FOREIGN PATENT DOCUMENTS

| DE | 4434247 A1 | 3/1996 |
|---|---|---|
| JP | H044567 U | 1/1992 |
| JP | H068882 A | 1/1994 |
| JP | H11304005 A | 11/1999 |
| JP | 2011220465 A | 11/2011 |

*Primary Examiner* — Lars A Olson
(74) *Attorney, Agent, or Firm* — Bryan Peckjian; SKF USA Inc. Patent Dept.

(57) ABSTRACT

A sealing system for sealing a shaft located under water includes a bush mountable on the shaft and fixed to the shaft, a housing fixed with respect to the bush and surrounding a first portion of the bush, a lubricant chamber and an air chamber in the housing and open to the bush, the lubricant chamber being sealed with respect to the air chamber by a seal ring, a mechanical seal outside the housing and surrounding a second portion of the bush, an air supply line and an air discharge line connected to the air chamber, and a quantity of lubricating oil in the lubricant chamber, the lubricating oil being in fluid communication with a lubricant tank via at least one oil line, wherein an air pressure in the air chamber is greater than an oil pressure in the lubricant chamber.

14 Claims, 2 Drawing Sheets

Fig. 1

SEALING SYSTEM, METHOD AND WATERCRAFT

CROSS-REFERENCE

This application is the U.S. National Stage of International Application No. PCT/EP2015/068049 filed on Aug. 5, 2015, which claims priority to German patent application no. 10 2014 217 223.3 filed on Aug. 28, 2014.

TECHNOLOGICAL FIELD

The invention relates to a sealing system for sealing a shaft located under water, a method for sealing a shaft located under water, and a watercraft including a sealing system for sealing a propeller shaft.

BACKGROUND

Conventional sealing systems for sealing a propeller shaft in watercraft have a bush placeable onto the shaft and connectable to the shaft such that they rotate together, which bush is enclosed by a housing fixed with respect to the bush. At least one lubricant chamber open to the bush and one air chamber open to the bush is formed in the housing. The chambers are sealed with respect to each other via a seal ring. In addition, a propeller-adjacent mechanical seal encompassing the bush is provided. Via a supply line and a discharge line a continuous air stream is guided through the air chamber and thus also through the annular chamber. The lubricant chamber is associated with a continuous grease-lubricating of the at least one seal ring. However, the grease-lubricating has the disadvantage that in the event of a grease ingress into the air chamber the air lines can be blocked, with the result that they must be regularly rinsed in an expensive manner. In addition, grease is not the optimal lubricant and coolant for the seal ring preferably comprised of an elastomer, with the result that the grease-lubricating negatively impacts its service life and in particular its loadability. Due to the continuous air stream, salts and minerals that can reach into the air chamber in the event of a water ingress, are also excreted, which can also lead to a blocking of the air lines.

SUMMARY

An object of the invention is to provide a sealing system for sealing a shaft located under water, which system eliminates the above-mentioned disadvantages and in particular makes possible a reliable, low-maintenance, and highly loadable shaft seal. It is also an object of the invention to provide a method for such a sealing of a shaft located under water as well as a watercraft including a propeller shaft sealed in this manner.

An inventive sealing system for sealing a shaft located under water has a bush placeable onto the shaft and connectable to the shaft such that they rotate together, which bush is enclosed by a housing fixed with respect to the bush. At least one lubricant chamber open to the bush and one air chamber open to the bush is formed in the housing. The chambers are sealed with respect to each other or axially separated from each other via a seal ring. For this purpose a propeller-adjacent mechanical seal encompassing the bush is provided. The sealing system has at least one supply line and one discharge line for the supplying and discharging of air into or out of the air chamber. According to the invention the at least one lubricant chamber is filled with a lubricant oil that is in fluid connection to a lubricant tank via at least one oil line, wherein an air pressure in the air chamber is greater than an oil pressure in the lubricant chamber.

Due to the higher internal chamber pressure in the air chamber than in the lubricant chamber it is prevented that the lubricant can enter into the air chamber from the lubricant chamber. Without sufficient air pressure the seal ring would be lifted by the oil pressure. An oil ingress is thus prevented. The oil pressure in the lubricant chamber is preferably greater than a reference pressure at a reference level by 0.02 bar to 0.2 bar. The oil pressure can be set, for example, by disposing the lubricant tank, viewed in the vertical direction, above the reference level. The air pressure or resting air pressure in the air chamber is preferably greater than the oil pressure by 0.1 to 0.5 bar. The reference level is located at the height of a shaft rotational axis or shaft longitudinal axis, which thus has a height of exactly zero with respect to the reference level. If lubricating oil unexpectedly enters into the air chamber, then due to its high fluidity it can nevertheless not block the air lines and in particular the discharge line, with the result that even in the event of lubricating-oil ingress the air supply of the air chamber and in particular an air- and leakage-discharge out of the air chamber is ensured. Furthermore the lubricating oil has a better lubricating- and cooling-effect with respect to the seal ring preferably formed from elastomer than a conventionally used lubricating grease. The inventive sealing system is suited in particular for the sealing of propeller shafts in watercraft with or without pod drive. The bush can then be, for example, a so-called shaft protection bush that is connected to a propeller and that prevents a direct contact of the propeller shaft with seawater. With only an oil line, a cleaning of the at least one lubricant chamber can be effected via the air chamber; that is, the oil pressure is increased such that the lubricating oil enters out of the lubricant chamber into the air chamber and is then discharged therefrom via the discharge line. The only one oil line is preferably disposed above the lubricant chamber in the installation position of the shaft. If a further oil line is provided an oil circuit or a continuous oil supplying can be realized by the lubricant chamber, wherein the oil supplying and the oil extraction preferably occurs in a diametrically opposed manner. However, the second oil line may also be controlled with draining of the lubricant chamber, so that despite two oil lines a discontinuous oil supplying occurs. Of course further oil lines can also be provided, for example, two supply-side oil lines and one discharge-side oil line.

The sealing system preferably has a control device that acts on a supply-side compressed-air control valve and/or on a discharge-side valve device. The, for example, pneumo-electric control device makes possible an automatic draining of the air chamber after a prescribed time interval. Preferably no continuous air stream is thus guided though the air chamber, but rather a discontinuous air-guiding occurs, which is expressed in a reduced air consumption with respect to the prior art described above. The draining or blowing-out itself is effected via an air pressure increase and is preferably also regulated via the control device. For this purpose it can also act on an air-pressure regulating valve that correspondingly controls a fluid connection to a compressed-air source or to an on-board compressed-air network. In order to ensure a pressing-out of liquid possibly collected in the air chamber due to an unlikely water ingress and/or oil ingress, an exhaust air pressure can be increased, for example, by 0.2 to 0.5 bar relative to a drainage height.

Alternatively or in addition to the control device a liquid-measuring device can be disposed supply-side, using which the liquid- or moisture-content in the line can be determined. The liquid-measuring device is embodied such that at a certain liquid- or moisture-level it either generates an alarm signal and thus indicates the need for a drainage process, and/or it can pass an activating signal on to the control device, with the result that a drainage process can be initiated automatically via the control device. It is thereby ensured that a drainage process of the air chamber is carried out even if the prescribed time interval of the control device has not yet expired or been reached. This is the case in particular with unforeseen events such as a water- and/or oil-intrusion.

A collection container for collecting of the liquid discharged from the air chamber, and a fill-level meter, can be disposed discharge-side of the air chamber, wherein upon reaching of a maximum liquid level in the container the fill-level sensor passes an activating signal on to the control device for initiating a drainage process and/or triggers an alarm signal. The collection container including the fill-level sensor can alternatively or additionally be disposed on the supply-line side of the liquid-measuring device. If the collection container including the liquid meter is alternatively provided on the supply-line side of the liquid-measurement device, it is ensured that a drainage process of the air chamber is even carried out if the prescribed time interval of the control device has not yet expired or been reached. This is the case in particular with unforeseen events such as a water- and/or oil-intrusion. If the collection container is additionally provided with the liquid meter, the liquid is guided out of the air-side discharge line in a targeted manner, wherein an overflowing of the collecting container is prevented by the liquid meter.

In order to prevent an uncontrolled air-pressure drop in the air chamber during draining of the air chamber, a throttle or throttle line can be provided discharge-side. If the above-described valve device is provided, the throttle is located downstream of the valve device or between the valve device and the discharge outlet.

Preferably the at least one lubricant chamber is sealed with respect to an interior on its side opposite the air chamber, in which interior an internal pressure prevails based on the reference level, which internal pressure is lower than the oil pressure. Due to the higher oil pressure with respect to the interior pressure it is prevented that air can penetrate out of the interior into the lubricant chamber through a seal disposed between the lubricant chamber and the interior. Without sufficient oil pressure the seal ring would be lifted by the air pressure. When the sealing system is integrated in a pod drive of a watercraft it is preferred when the environmental pressure or atmospheric pressure prevailing outside the watercraft above a waterline prevails in the interior or pod interior. The atmospheric pressure at water level thus prevails in the interior.

Preferably the air chamber is in fluid connection with an annular chamber of the mechanical seal, which annular chamber is open to the bush or delimited thereby. Thus the annular chamber is thus also impinged by the air pressure. It is thereby prevented or at least impeded that seawater can penetrate into the annular chamber, for example, in the event of a defect of the mechanical seal. In addition, the annular chamber is also drained with blowing-out of the air chamber.

In an inventive method for sealing a shaft located under water, wherein at least one lubricant chamber open to the shaft is charged with a lubricating oil and an axially adjacent air chamber open to the shaft is charged with air, wherein the chambers are radially inwardly closed by the shaft or by a bush disposed on the shaft, and a seal ring is disposed between the chambers, which seal ring separates the two chambers from each other, according to the invention the air pressure in the air chamber is set greater than the oil pressure in the lubricant chamber. The inventive method makes possible a reliable and low-maintenance sealing of a propeller shaft of a watercraft.

An air consumption can be kept low if the air chamber is intermittently drained. Due to the intermittent drainage an air flow is only formed during a drainage process, but the air chamber is only opened from time to time in the direction of the discharge line.

An inventive watercraft is provided with an inventive seal system for sealing its at least one propeller shaft. A watercraft is thereby provided that has a reliable, low-maintenance, and low-energy propeller-shaft-side sealing.

Other advantageous exemplary embodiments of the invention are the subject matter of the further dependent claims.

In the following two preferred exemplary embodiments of the invention are explained in more detail with reference to schematic depictions.

BRIEF DESCRIPTION OF THE DRAWINGS

FIG. 1 shows a schematic construction of a first exemplary embodiment of an inventive sealing system.

DETAILED DESCRIPTION

Figure 1:
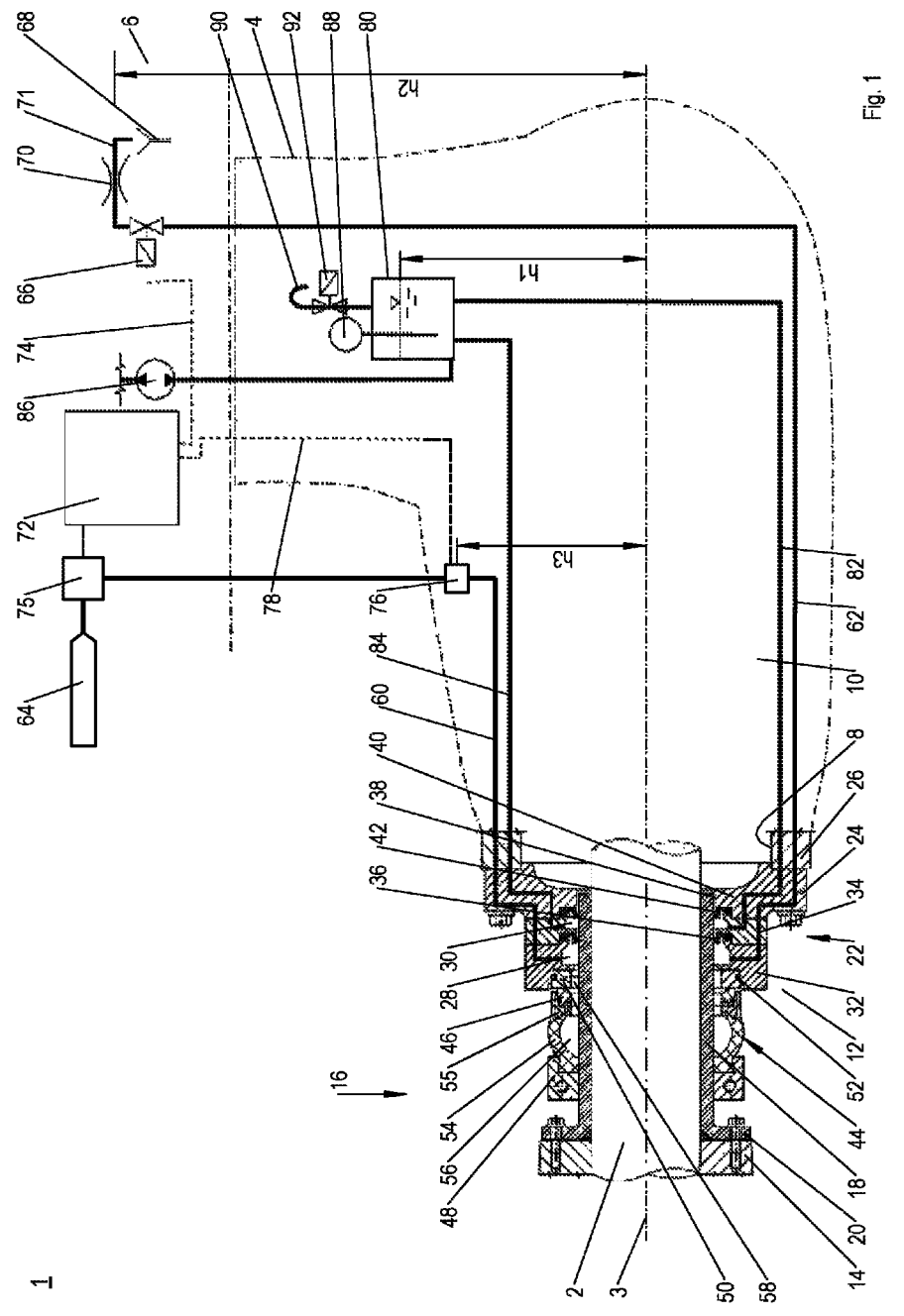
Figure 2:
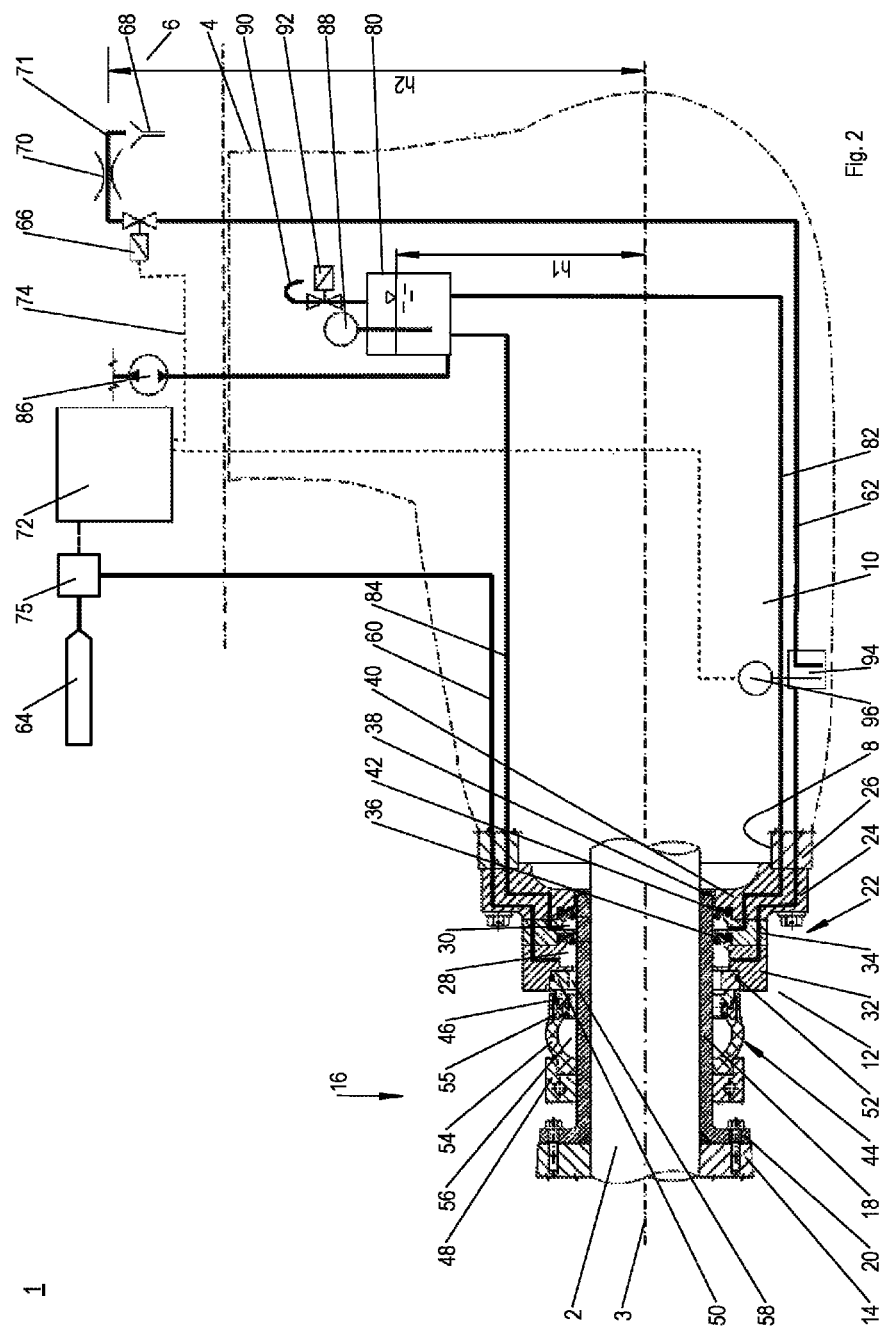
FIG. 2 shows a second exemplary embodiment of the inventive sealing system.

In FIG. 1 a first exemplary embodiment is shown of an inventive sealing system 1 of a shaft 2 located under water. The shaft 2 is rotatable about its longitudinal axis 3 and is preferably a propeller shaft of a watercraft. As depicted, in the installation position and in the floating position of the watercraft it is oriented essentially horizontally or with slight inclination with respect to the horizontal. The longitudinal axis 3 or shaft rotational axis provides a reference level for a refilling level h1, a drainage height h2, and a measuring height h3 to be explained in more detail in the following. The shaft rotational axis 3 lies virtually at the reference level at a height h0.

Here the watercraft has at least one drive-side pod 4 that is pivotably suspended on a ship's hull 6 in the vertical direction. The shaft 2 is guided through an opening 8 from an interior 10 of the pod 4 into a seawater space 12 and provided end-side with a propeller 14.

The sealing system 1 essentially has a shaft seal 16 explained in the following, a lubricating-oil supply to be explained in the following, and an air supply also explained in the following.

The shaft seal 16 includes at least one bush 18 that is disposed on the shaft 2 such that they rotate together and has an annular flange 20, via which it is screwed onto the propeller 14. The bush 18 is enclosed by a housing 22 that has a ring flange 24 for attaching to a pod section 26 surrounding the opening 8. The bush or shaft protection bush 18 thus encloses the shaft 2 over its entire free length outside the pod and protects it from seawater.

The housing 22 forms an air chamber 28 open to the bush 18 and a lubricant chamber 30 axially adjacent and also open to the bush 18. Here the lubricant chamber 30 is located on a side of the air chamber 28 facing the pod 4. The chambers 28, 30 are each formed in a housing segment 32, 34 and sealed with respect to each other by a seal ring 36. The seal ring 36 is a radial shaft seal ring and in particular here an elastomeric lip seal that is oriented toward the air chamber 28. For sealing an annular gap 38 that is formed between a housing segment 40 forming the annular flange 24 and the bush 18, a seal ring 42 is inserted on a side of the lubricant chamber 30, distant from the air chamber 28, between the housing segment 34 and the housing segment 40. The seal ring 42 is also a radial shaft seal ring and here in particular an elastomer lip seal that is oriented toward the lubricant chamber 30. Due to the orientation of the seal ring or of the lip seal 36 in the air chamber 28 and due to the orientation of the seal ring or of the lip seal 42 in the lubricant chamber 30 their seal lips each protrude into the chamber 28, 30 usually chargeable with a high pressure.

A mechanical seal 44 is provided between the air chamber 28 and the ring flange 20 of the bush 18, which ring flange 20 receives the propeller 14. The mechanical seal 44 has a slide ring 46 disposed on the bush 18, which slide ring 46 is disposed between a propeller-side clamp ring 48 positioned on the bush 18 and a bearing-housing-side counter-ring 50. The rotating slide ring 46 is in preloaded contact with the non-rotating counter-ring 50, which is inserted in a not-quantified axial recess of the housing segment 32 forming the air chamber 28. In order to prevent a water ingress outer-circumference-side of the counter-ring 50 into the air chamber 28, an outer seal ring 52 is inserted between the counter-ring 50 and an opposing inner-circumference section of the axial recess. A seal bellows 54, for example an elastomer seal bellows, is disposed on a side of the slide ring 46 facing the clamp ring 48. The seal bellows 54 is clamped on its one end by the clamp ring 48 and on has on its other end a vulcanized-on slide-ring receptacle 55 that is in operative connection with the slide ring 56 via a not-quantified attachment. The mechanical seal 44 delimits an annual chamber 56 surrounding the bush 18, which annular chamber 56 is in fluid connection with the air chamber 28 via an annular gap 58.

The air supply serves for supplying and discharging of air into or out of the air chamber 28. For this purpose at least one supply line 60 opening into the air chamber 28 and one discharge line 62 extending out of the air chamber 28, a compressed air source 64, and a valve device such as a solenoid valve 66 are provided. In the exemplary embodiment shown here the supply line 60 is disposed above the discharge line 62, whereby liquids can be reliably led out of the air chamber 28. The supply line 60 is connected to the compressed air source 64, which is preferably disposed in the ship's hull 6 and thus above the pod 4 with respect to the shaft axis of rotation 3 in the installation position. The compressed air source 64 here symbolizes a ship-side compressed-air network into which the air supply is integrated. Of course instead of an integration into the on-board compressed-air network a separate compressed air source 64 can also be provided only for the sealing system 1 or its air supply. The valve device 66 for opening and closing the discharge line 62 is disposed discharge-line side and here in the ship's hull 6. The discharged air can be fed to a collection container 68, for example of a bilge 68, via the valve device 66. In order to avoid an uncontrolled air-pressure drop in the air chamber 28 during blowing-out, a throttle or throttle line is provided downstream of the valve device 66 or between the valve device 66 and the bilge 68. A discharge-line section 71 downstream of the valve device, and here the discharge-line section receiving the throttle 70, is located at the drainage height h2 based on the reference level, which drainage height h3 represents the highest point of the discharge line.

A control device 72 is also disposed supply-line-side of the air chamber 28, which control device 72 acts on the valve device 66 via a control line 74. After a certain time interval the control device 72 conducts an automatic draining or blowing-out of the air chamber 28. For this purpose the control device 72 provides a corresponding opening signal to the valve device 66 via the control line 74. The control device 72 simultaneously controls a flow-through cross-section of a supply-line-side pressure-regulation valve 75 disposed downstream of the compressed-air source 64, with the result that a continuous air stream is guided through the air chamber 28 with, in addition, an increased exhaust air pressure compared to a resting air pressure. The pressure-regulation valve 75 is preferably a proportional pressure-regulation valve. A liquid measuring device is disposed downstream of the control device 72 and thus between the control device 72 and the air chamber 28, using which liquid measuring device 76 a liquid- or moisture-content in the supply line 60, for example due to a water- or lubricating-oil-intrusion into the air chamber 28 can be determined. Via a signaling line 78 the liquid-measuring device 76 provides an activating signal to the control device 72. Alternatively or additionally it can trigger an alarm signal. It is preferably located at the drainage height h3 with respect to the reference level. During blowing-out of the air chamber 28 the exhaust pressure is increased by 0.2 to 0.5 bar with respect to a corresponding water column of the drainage height h3.

The lubricant supply serves for supplying and discharging the lubricating oil into the lubricant chamber 30 for lubricating the seal rings 36, 42. For this purpose at least one lubricant tank 80, one feed line 82 opening into the lubricant chamber 30, and one discharge line extending from the lubricant chamber 30, as well as a lubricant pump 86, are provided. The providing of two oil lines 82, 84 here is only exemplary. Of course only one oil line 82 or more than two oil lines 82, 84 is/are also conceivable. The supply line 82 and the discharge line 84 are in fluid connection with the lubricant tank 80, with the result that a circulation pumping of the lubricant can be effected or a continuous lubricant flow can be guided through the lubricant chamber 30. In the exemplary embodiment shown here including two oil lines 80, 82 the supply line 82 is disposed below and the discharge line 84 above the reference level, so that in particular gases in the lubricant chamber 30 can be reliably led out. Here the lubricating oil discharged from the lubricant chamber 30 can be subjected to a cleaning process not further described, such as a possible dewatering, degassing, and desalting, and supplied to the lubricant chamber 30 again as fresh oil. The lubricant tank 80 is preferably located in the interior 10 of the pod at the refilling height h1 with respect to the reference level. In relation to the measuring height h1 and to the drainage height h3 the lubricant tank 80 is disposed in the vertical direction between the air-supply- and supply-line-side liquid measuring device 76 and the air-supply- and discharge-line-side discharge-line-section 71. The lubricant tank 30 is in particular disposed such that an oil pressure prevails in the lubricant chamber 30 that is increased by approximately 0.02 bar to 0.2 bar with respect to a reference pressure or internal pressure at the height of the reference level.

The lubricant pump 86 serves for lubricant-tank emptying or lubricant-tank filling. In the exemplary embodiment shown here the lubricant pump 86 is positioned ship's-hull-side and thus not disposed in the pod 4.

For measuring a lubricant level in the lubricant tank 80 a fill-level meter 88 is disposed therein. This is embodied in a simple form as a float switch and is in operative connection with the lubricant pump 86 for automatic filling upon falling below a minimum lubricant level. The lubricant tank 80 is ventilated via a ventilating line 90 that is openable via a shut-off valve 92. The shut-off valve 92 is preferably electrically actuatable and is closed in the event of damage of the seal ring 36.

In the following a preferred inventive method for sealing a shaft 2 located under water is explained in more detail. In operation a continuous oil stream is guided through the lubricant chamber 30 using the lubricating-oil supply so that the seal rings 36, 42 are oil-lubricated. Preferably an oil pressure in the lubricant chamber 30 is set that arises from the refilling height h1. In the exemplary embodiment described here the oil pressure is 0.02 to 0.2 bar higher than an internal pressure in the interior 10 of the pod 4 at the height of the reference level. Atmospheric pressure preferably prevails in the interior 10.

The air chamber 28 is charged with a resting air pressure using the control device 72 and the pressure-regulation valve 75, which resting air pressure is 0.1 to 0.5 bar higher than the oil pressure in the lubricant chamber 30 is. In normal operation the discharge line 62 of the air chamber 28 is closed. In drainage operation, that is, after a time interval recorded by the control device 72, a drainage process of the air chamber 28 is initiated. For this purpose the pressure-regulation valve 75 is opened via the control device 72 and the air pressure in the air chamber 28 is increased by, for example, 0.2 bar to 0.5 bar corresponding to a so-called water column at the drainage height h2, in order to push out possibly present liquids out of the air chamber 28. At the same time the valve device 66 is acted on via the control device 72 by an opening signal and thus the discharge line 62 is opened towards the bilge 68.

After the occurring of blowing-out or draining the valve device is acted on via the control device 72 by a closing signal and thus the discharge line 62 is closed. At the same time the air pressure is set via the pressure-regulation valve 75 to the reduced pressure value. Subsequently the resting air pressure is automatically held constant via the pressure-regulation valve 75.

If the liquid measuring device 76 records a certain liquid- or moisture-content in the supply line 60 at the measuring height h3, the liquid measuring device 76 preferably provides an activating signal via the signal line 78 and to the control device 72 for initiating a drainage process, independent of reaching a time interval. The liquid measuring device 76 thus represents an additional device to the control device 72 so that even in the event of a sudden water- and/or oil-intrusion into the air chamber 28 a timely or immediate drainage of the air chamber 28 is ensured. In addition a drainage of the air chamber 28 is ensured using the liquid device 76 even if a time recording of the control device 72 should unexpectedly malfunction. However, the drainage can also be effected manually by operating personnel. For this purpose the liquid measuring device 76 can trigger an alarm signal. However, the alarm signal can also be generated with an automatic drainage in order to notify the operating personnel of the liquid intrusion so that they can undertake corresponding measures, for example, monitoring- and/or repair-measures.

Since the seal ring 36 is oriented toward the air chamber 28 between the air chamber 28 and the lubricant chamber 30, it is pressed against the bush 28 at all times via the air pressure with the result that a lifting of this seal ring 36 by the lubricating oil located in the lubricant chamber 30 is prevented. In an analogous manner the seal ring 42 between the lubricant chamber 30 and the interior 10 of the pod 4 is pressed by the lubricating oil against the bush 18, and it is thus prevented that the interior pressure lifts the seal ring 42 from the bush 18.

In the exemplary embodiment shown in FIG. 2 of the inventive seal system 1, in contrast to the first exemplary embodiment according to FIG. 1 instead of a liquid measuring device 76 supply-side to the air chamber 28 as additional device to the control device 72, an additional device is disposed discharge-line side of the air chamber 28. This has a collection container 94 for collecting of liquid exiting from the air chamber 28 and a fill-level meter 96. The liquid from the air chamber 28 passes into the collection container 94 and accumulates there. The fill-level meter 96 is connected to a control device via a signal line 78. Upon reaching of a certain liquid level in the collection container 94 the fill-level meter 96 provides a activation signal to the control device 72 via the signal line 78, whereupon the control device 72 initiates a drainage process described in FIG. 1.

In addition, in particular in a drainage process controlled by control member 72 the collection container 94 serves as collection point for air-chamber-adjacent discharging of the liquid out of the discharge line 62. A quantity of liquid collected here in the collection container 94 and/or liquid composition thereby provides information about the seal effect of the seal rings 36, 42. Here based on the liquid quantity and/or liquid composition the control device 72 can itself set or readjust the time interval for regular automatic draining of the air chamber 28, and furthermore a point in time is prescribed for replacing the seal rings 36, 42.

Disclosed is a sealing system for sealing a shaft located under water, in particular a propeller shaft of a ship, including two sealing systems, wherein the propeller-distant sealing system preferably has at least one lip seal for separating of an air chamber from a lubricant chamber, and the propeller-adjacent sealing system has a mechanical seal, wherein an air pressure in the air chamber is greater than a lubricating-oil pressure in the lubricant chamber, a method for sealing a shaft, in particular a propeller shaft, and a watercraft.

REFERENCE NUMBER LIST

1 Sealing system
2 Shaft/propeller shaft
3 Longitudinal axis/shaft rotational axis/reference level
4 Pod
6 Ship's hull
8 Opening
10 Interior
12 Seawater space
14 Propeller
16 Shaft seal
18 Bush/shaft protection bush
20 Annular flange
22 Housing
24 Annular flange
26 Pod section
28 Air chamber
30 Lubricant chamber
32 Housing segment
34 Housing segment
36 Seal ring/lip seal
38 Ring gap
40 Housing segment
42 Seal ring/lip seal
44 Mechanical seal 46 Slide ring
48 Clamp ring
50 Counter-ring
52 Outer seal ring
54 Seal bellows
55 Slide ring receptacle
56 Annular chamber
58 Annular gap
60 Supply line
62 Discharge line
64 Compressed-air source
66 Valve device
68 Collection container/bilge
70 Throttle/throttle line
71 Discharge line section
72 Control device
74 Control line
75 Pressure-regulating valve
76 Liquid measuring device
78 Signal line
80 Lubricant tank
82 Supply line
84 Discharge line
86 Lubricant pump
88 Fill-level meter
90 Ventilation line
92 Shutoff valve
94 Collection container
96 Fill-level meter

The invention claimed is:

1. A sealing system for sealing a shaft located under water, including a bush placeable onto the shaft and connectable to the shaft such that they rotate together, which bush is enclosed by a housing fixed with respect to the bush, wherein at least one lubricant chamber open to the bush and an air chamber open to the bush are formed in the housing, wherein the at least one lubricant chamber and the air chamber are sealed with respect to each other via a seal ring, including a mechanical seal encompassing the bush, and including a supply line and a discharge line for supplying and discharging air into or out of the air chamber, wherein the at least one lubricant chamber is filled with a lubricating oil that is in fluid communication with a lubricant tank via at least one oil line, and wherein an air pressure in the air chamber is greater than an oil pressure in the lubricant chamber.

2. The sealing system according to claim 1, wherein a control device is provided that acts on a compressed-air-source-side compressed-air-regulation valve and/or on a discharge-line-side valve device.

3. The sealing system according to claim 2, wherein a liquid measuring device is disposed supply-line-side, which liquid measuring device, upon reaching a certain liquid- or moisture-content, sends an activation signal to the control device for initiating a drainage process, and/or triggers an alarm signal.

4. The sealing system according to claim 2, wherein a collection container for collecting liquid discharged from the air chamber and a fill-level meter are disposed discharge-line side, which fill-level meter upon reaching a maximum liquid level in the collection container sends an activation signal to the control device for initiating a drainage process and/or triggers an alarm signal.

5. The sealing system according to claim 1, wherein a throttle is disposed discharge-line side.

6. The sealing system according to claim 1, wherein the lubricant chamber is sealed with respect to an interior on its side opposing the air chamber, wherein a pressure in the interior is lower than the oil pressure.

7. The sealing system according to claim 1, wherein the air chamber is in fluid connection with an annular chamber of the mechanical seal, which annular chamber is open to the bush.

8. A watercraft including a sealing system for sealing at least one propeller shaft according to claim 1.

9. The sealing system according to claim 1,
wherein a control device is provided that acts on a compressed-air-source-side compressed-air-regulation valve and/or on a discharge-line-side valve device,
wherein a liquid measuring device is disposed supply-line-side, which liquid measuring device, upon reaching a certain liquid or moisture content, sends an activation signal to the control device for initiating a drainage process, and/or triggers an alarm signal,
wherein a collection container for collecting liquid discharged from the air chamber and a fill-level meter are disposed discharge-line side, which fill-level meter upon reaching a maximum liquid level in the collection container sends an activation signal to the control device for initiating a drainage process and/or triggers an alarm signal,
wherein a throttle is disposed discharge-line side,
wherein the lubricant chamber is sealed with respect to an interior on its side opposing the air chamber, the interior having a pressure lower than the oil pressure, and
wherein the air chamber is in fluid connection with an annular chamber of the mechanical seal, which annular chamber is open to the bush.

10. A sealing system for sealing a shaft located under water, comprising:
a bush mountable on the shaft and connectable to the shaft such that they rotate together;
a housing fixed with respect to the bush and surrounding a first portion of the bush;
a lubricant chamber in the housing and open to the bush;
an air chamber in the housing and open to the bush and sealed with respect to the lubricant chamber by a first seal ring;
a mechanical seal outside the housing and surrounding a second portion of the bush and defining with the bush an annular chamber;
a supply line configured to supply air to the air chamber;
a discharge line configured to discharge the air from the air chamber; and
a quantity of lubricating oil in the lubricant chamber, the lubricating oil being in fluid communication with a lubricant tank via at least one oil line,
wherein an air pressure in the air chamber is greater than an oil pressure in the lubricant chamber.

11. The sealing system according to claim 10, wherein the lubricant chamber is sealed with respect to an interior on a side opposite the air chamber by a second seal ring, and wherein a pressure in the interior is lower than the oil pressure.

12. The sealing system according to claim 11, wherein the air chamber is in fluid connection with an annular chamber of the mechanical seal, the annular chamber being located on a side of the air chamber opposite the oil chamber, and wherein the annular chamber is open to the bush.

13. A method for sealing a shaft located under water, wherein the shaft extends though a housing and is at least partly covered by a bush, and wherein an air chamber is defined between the bush and the housing and an oil chamber is defined between the bush and the housing, and wherein the air chamber is separated from the oil chamber by a seal ring; the method comprising:

maintaining an oil pressure in the oil chamber at a first level; and maintaining an air pressure in the air chamber at a second level greater than the first level.

14. The method according to claim 13 including intermittently draining the air chamber.

* * * * *